United States Patent [19]
Goldbach et al.

[11] Patent Number: 6,102,157
[45] Date of Patent: Aug. 15, 2000

[54] SELF-CONTAINED STAGING SYSTEM FOR CLEANING AND PAINTING BULK CARGO HOLDS

[75] Inventors: Richard A. Goldbach; James A. McMichael; Charles A. Garland, all of Norfolk, Va.

[73] Assignee: Metro Machine Corporation, Norfolk, Va.

[21] Appl. No.: 09/356,516

[22] Filed: Jul. 19, 1999

Related U.S. Application Data

[63] Continuation-in-part of application No. 08/802,676, Feb. 19, 1997, Pat. No. 5,823,291, and a continuation-in-part of application No. 08/806,097, Feb. 25, 1997, Pat. No. 5,807,168, which is a continuation-in-part of application No. 08/802,676, Feb. 19, 1997, Pat. No. 5,823,291, and a division of application No. 09/152,691, Sep. 14, 1998.

[51] Int. Cl.[7] ........................................................ B24C 3/06
[52] U.S. Cl. .............................. 182/128; 182/141; 451/75
[58] Field of Search .................................... 182/128, 65.2, 182/141, 146, 148; 118/323, 306; 451/75

[56] References Cited

U.S. PATENT DOCUMENTS

| | | |
|---|---|---|
| 849,222 | 4/1907 | Fleming . |
| 2,500,660 | 3/1950 | Chappen . |
| 3,031,027 | 4/1962 | Mitchell . |
| 3,093,210 | 6/1963 | Picard . |
| 3,149,438 | 9/1964 | Morley et al. . |
| 3,306,396 | 2/1967 | Goss . |
| 3,516,512 | 6/1970 | Kupke et al. . |
| 3,517,771 | 6/1970 | Mähringer et al. . |
| 3,548,541 | 12/1970 | Miller . |
| 3,753,413 | 8/1973 | Ichikawa et al. . |
| 3,891,051 | 6/1975 | Takenouchi et al. . |
| 4,027,433 | 6/1977 | Hockett . |
| 4,048,956 | 9/1977 | Estenbanez et al. . |

(List continued on next page.)

FOREIGN PATENT DOCUMENTS

| | | |
|---|---|---|
| 0 141 120 | 8/1984 | European Pat. Off. . |
| 0537869A2 | 4/1993 | European Pat. Off. . |
| 0 609 634 A1 | 7/1993 | European Pat. Off. . |
| 0 614 802 A1 | 3/1994 | European Pat. Off. . |
| 2 313 135 | 6/1976 | France . |
| 2 384 437 | 3/1977 | France . |
| 2 458 503 | 6/1979 | France . |
| 59-209765 | 11/1984 | Japan . |
| 4-193482 | 7/1992 | Japan . |
| 9101910 | 11/1991 | Netherlands . |
| 992702 | 1/1983 | Russian Federation . |
| 998106 | 7/1965 | United Kingdom . |
| 1098839 | 1/1968 | United Kingdom . |
| 1 151 793 | 5/1969 | United Kingdom . |
| 1 382 112 | 1/1975 | United Kingdom . |
| WO 97/48527 | 12/1997 | WIPO . |

OTHER PUBLICATIONS

Patent Abstracts of Japan, 04193482, Jul. 13, 1992.
Patent Abstracts of Japan, 59209765, Nov. 28, 1984.
Patent Abstracts of Japan, 60263670, Dec. 27, 1985.
Patent Abstracts of Japan, 61103777, May, 22, 1986.
Patent Abstracts of Japan, 63229269, Sep. 26, 1988.
Abstract, European Appln. No. EP 141120 A.
Article: "Closed Curcuit" grit blasting; Shipbuilding and Shipping Record, Jun. 14, 1968; No. XP–002123216.

*Primary Examiner*—Alvin Chin-Shue
*Attorney, Agent, or Firm*—Pillsbury Madison & Sutro LLP

[57] ABSTRACT

Each of a plurality of cargo holds of a bulk carrier vessel has a self-contained staging system lowered into it, from the platform track of which workers operate semi-automatic blasting machines that are mounted onto the platform. The set-up for each vessel also includes, for each hold, a ventilation unit provided on a hatch plug, and a transporter for the staging system. Groups of staging systems are served by on-deck air compressors. Staging systems actually engaging in blasting are served by recycling shot blast units which recycle and supply steel shot. Following blast cleaning, the cleaned surfaces are painted from the platforms.

14 Claims, 13 Drawing Sheets

U.S. PATENT DOCUMENTS

| | | |
|---|---|---|
| 4,057,943 | 11/1977 | Lienhard . |
| 4,417,542 | 11/1983 | Bellafiore . |
| 4,683,836 | 8/1987 | West . |
| 4,809,814 | 3/1989 | St-Germain . |
| 5,067,504 | 11/1991 | Coleman, III . |
| 5,185,183 | 2/1993 | Gonda et al. . |
| 5,340,400 | 8/1994 | Schmidt et al. . |
| 5,353,729 | 10/1994 | Goldbach et al. . |
| 5,398,632 | 3/1995 | Goldbach et al. . |
| 5,540,172 | 7/1996 | Goldbach et al. . |
| 5,542,495 | 8/1996 | Aulakh . |
| 5,656,085 | 8/1997 | Hezel . |
| 5,716,261 | 2/1998 | Watkin . |
| 5,807,168 | 9/1998 | Goldbach . |
| 5,823,291 | 10/1998 | Goldbach . |

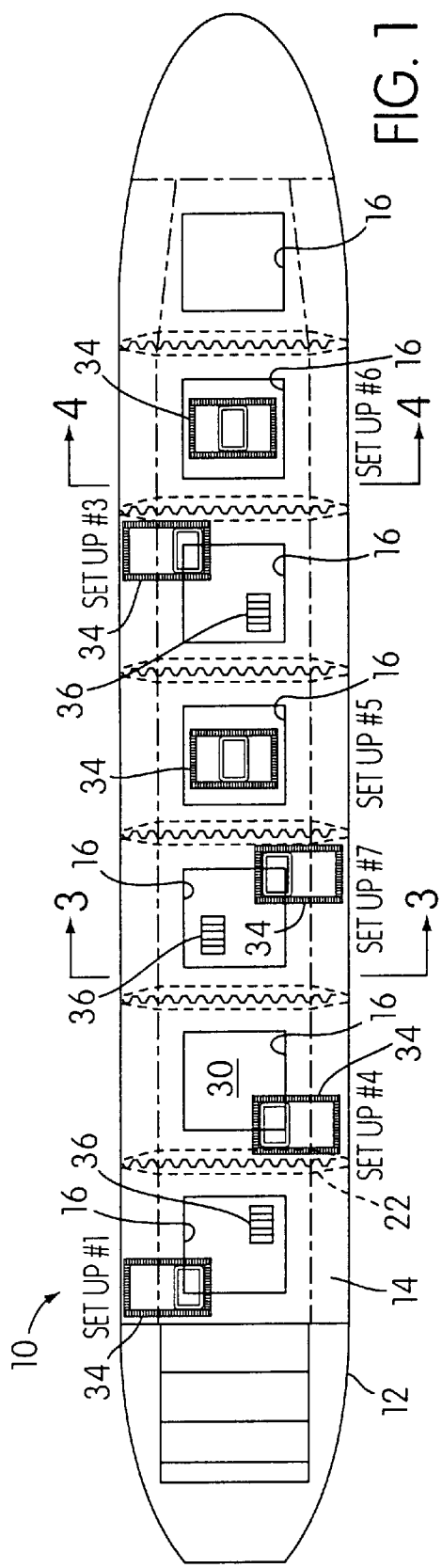
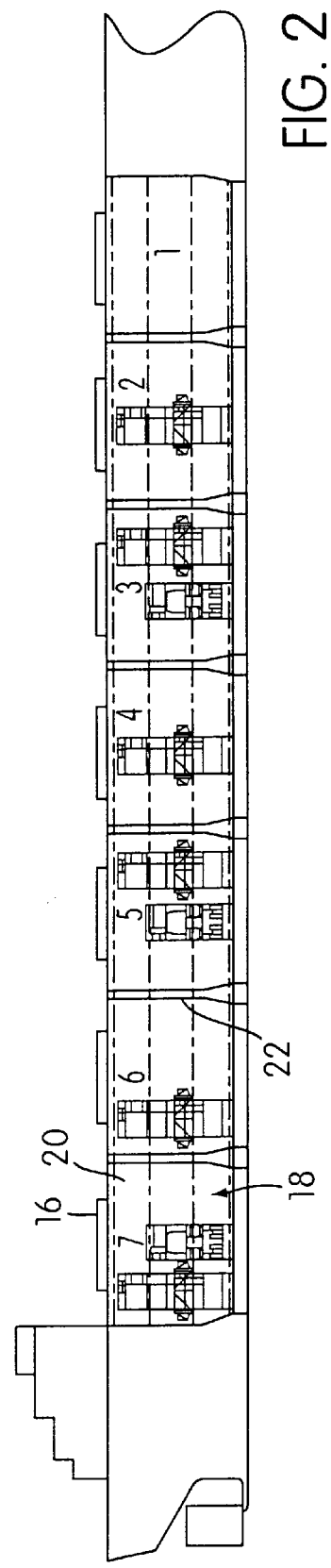

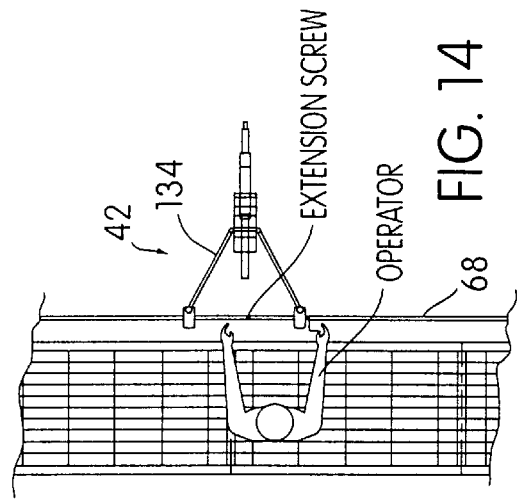
FIG. 14
FIG. 13
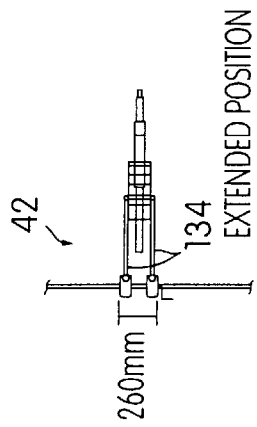
FIG. 12
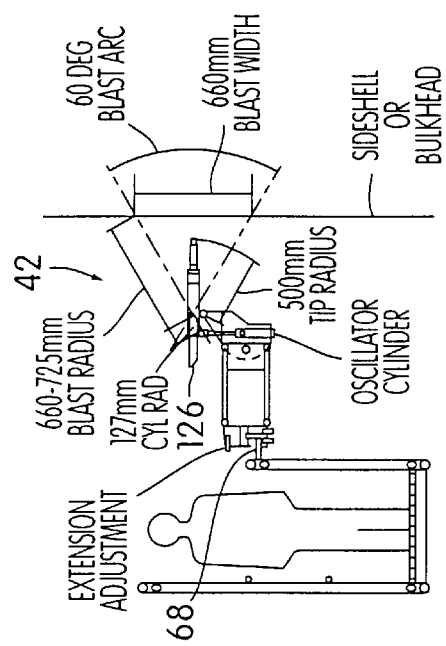
FIG. 17
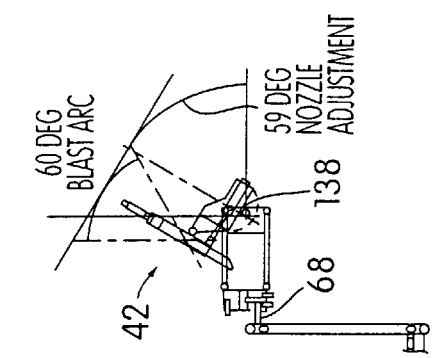
FIG. 16
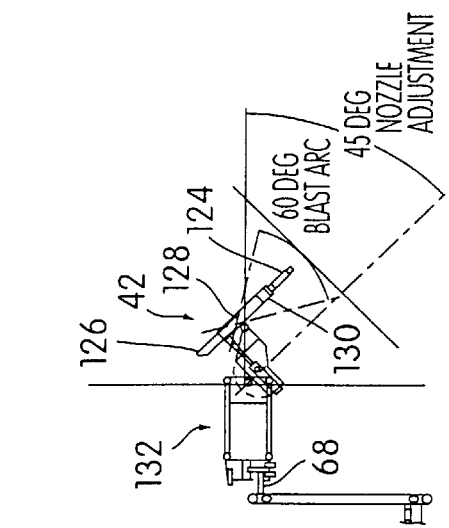
FIG. 15

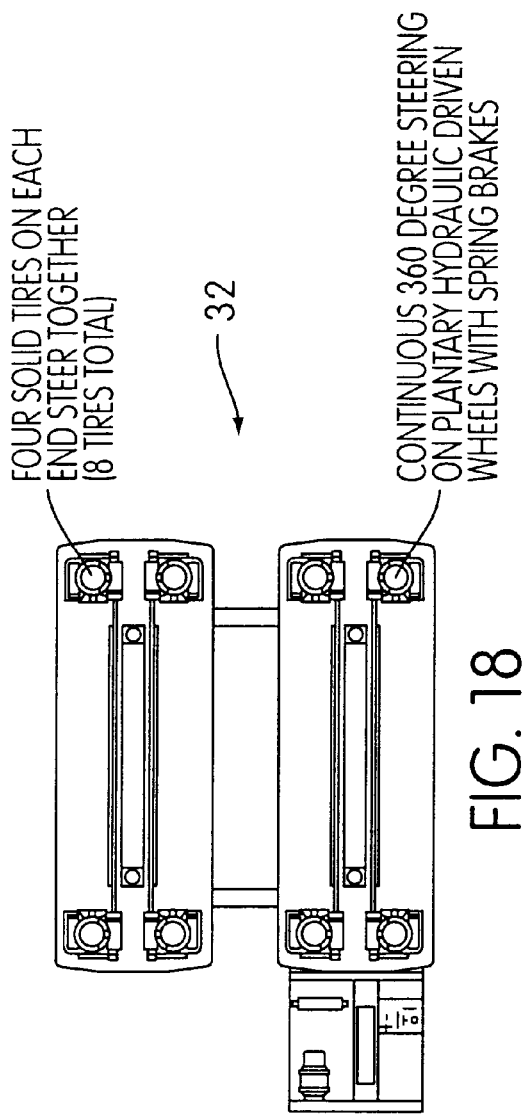
FIG. 18
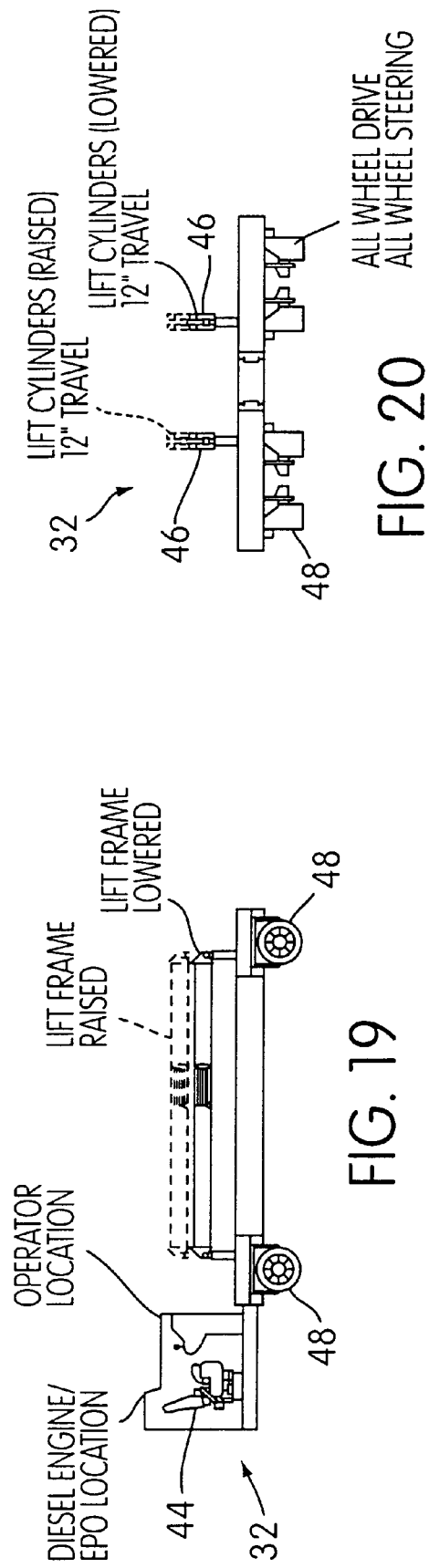
FIG. 20
FIG. 19

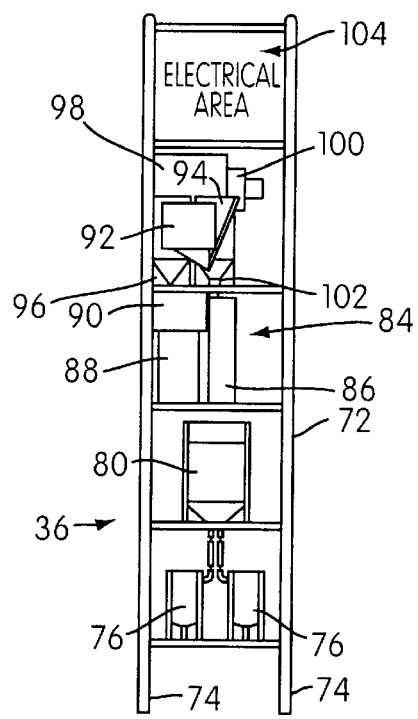
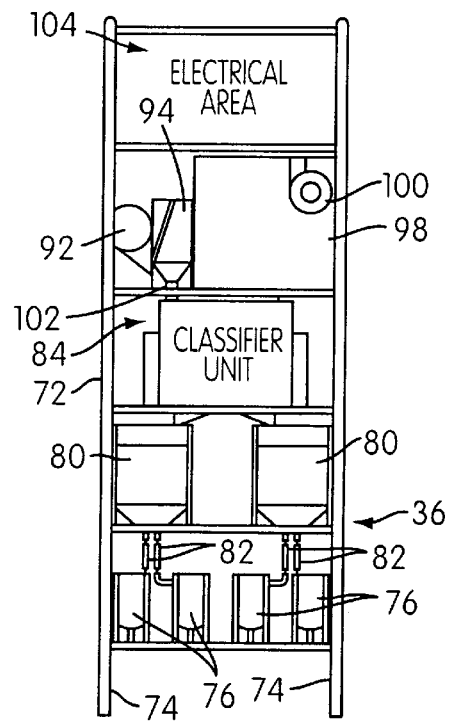
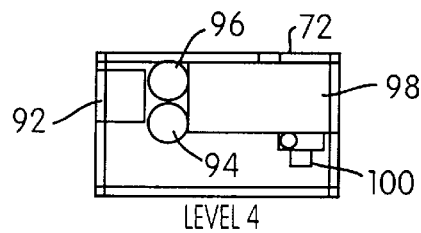
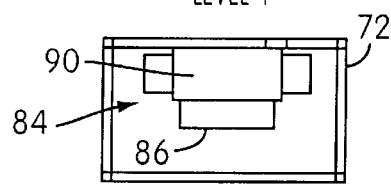
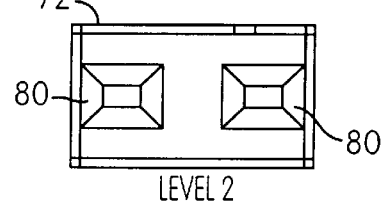
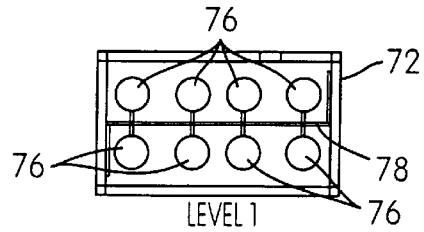

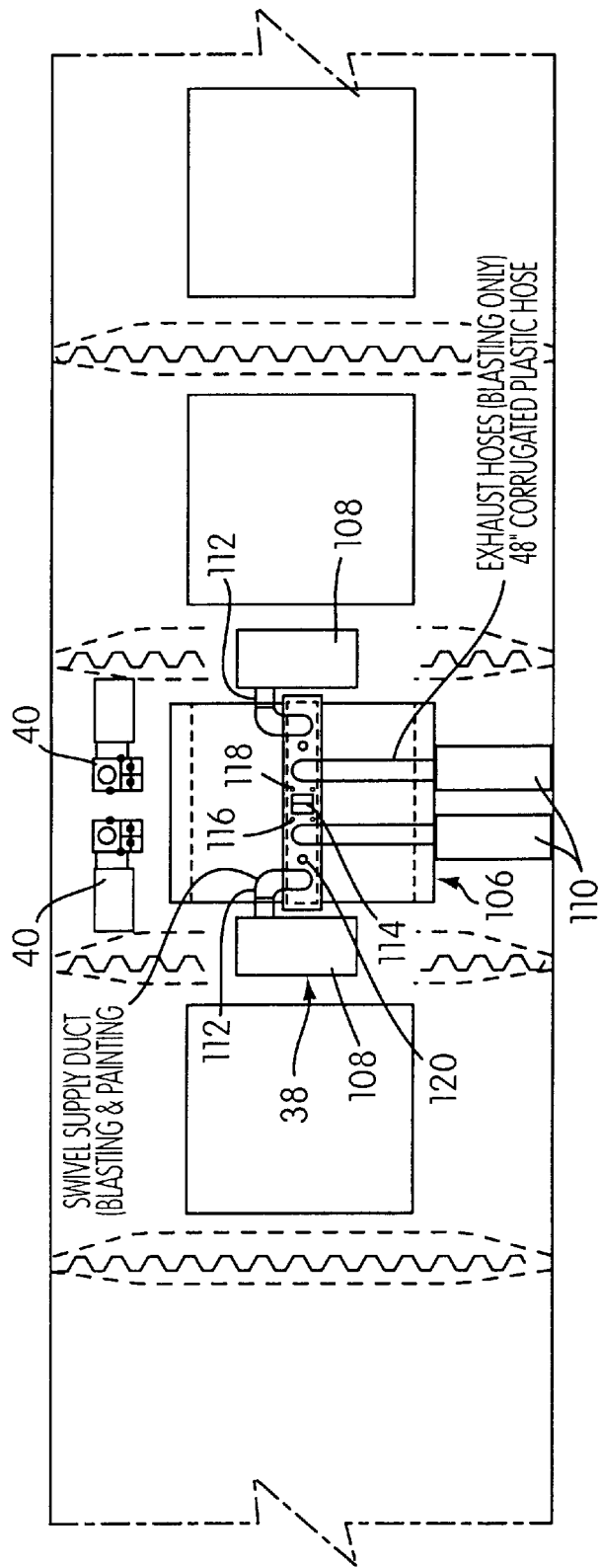

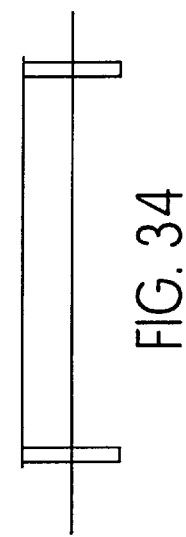
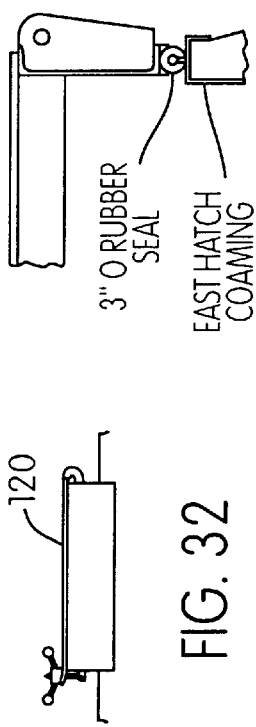
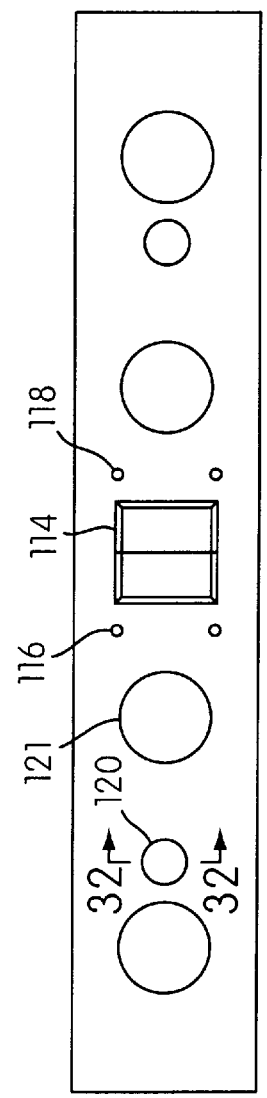
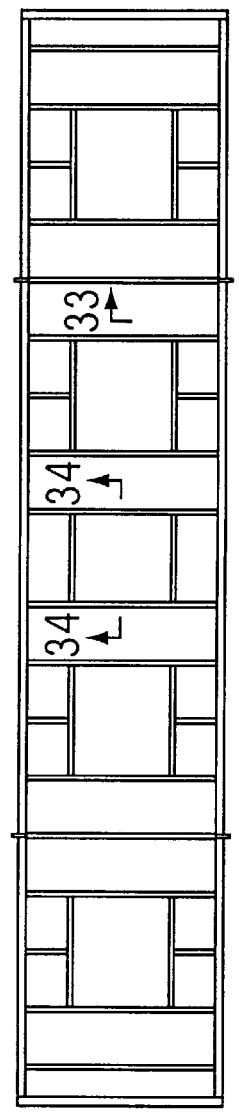

FIG. 40

SELF-CONTAINED STAGING SYSTEM FOR CLEANING AND PAINTING BULK CARGO HOLDS

REFERENCE TO RELATED APPLICATIONS

This is a division of application Ser. No. 09/152,691, filed Sep. 14, 1998. This is a division of application Ser. No. 09/152,691, filed Sep. 14, 1998 which is a continuation-in-part of application Ser. No. 08/802,676, filed Feb. 19, 1997, U.S. Pat. No. 5,823,291, issued Oct. 20, 1998, and a continuation-in-part of application Ser. No. 08/806,097, filed Feb. 25, 1997, U.S. Pat. No. 5,807,168 issued Sep. 15, 1998 which is a continuation-in-part of application Ser. No. 08/802,676, filed Feb. 19, 1997 U.S. Pat. No. 5,823,291 Oct. 20, 1998.

BACKGROUND OF THE INVENTION

A typical bulk carrier is a shipping vessel having a hull, within at least a major portion of at least the midbody of which, the internal volume bounded by the sidewalls and bottom of the hull, is partitioned into a plurality of cargo holds (sometimes alternatively called tanks). Depending on the vessel width and length, the cargo holds are arranged in one or more side-by-side columns extending lengthwise of the vessel and separated by longitudinal bulkheads, and a plurality of longitudinally adjacent rows and separated by transverse bulkheads. The upper ends of the longitudinal bulkheads and hull sidewalls, with associated structure, provide respective fore-aft walkways of the deck of the vessel, and the upper ends of the transverse bulkheads provide port-starboard walkways of the deck. The bottoms of the individual holds are formed by respective portions of the upper surfaces of the inner side of the bottom of the hull. Portions of the sidewalls of individual holds, whether formed by vessel hull sidewall, sides of longitudinal bulkheads or sides of transverse bulkheads are generally vertical, but may have sloped, beveled or curved regions. The holds typically are open at the top throughout an area which is, at most, substantially large as their maximum cross-sectional area. These openings, generally referred to as hatches, are normally closed during transportation, storage and waiting periods, by openable hatch covers. Hatch covers may be designed to be physically lifted out of position as a unit, or to be folded, tented or rolled out of position.

A typical bulk cargo vessel is used for transporting a flowable or pumpable commodity, without use of any containers or packaging material but for the confines of the hold. However, sometimes boxes, bags, drums, containers and other packaging confines the commodity being shipped in a hold, in quanta smaller than the bulk of a single hold.

A bulk cargo vessel may be single-hulled throughout, double-hulled throughout, or partially double-hulled (for instance, double bottomed) and the remainder single-hulled.

The walls of each side, the bottom and the top of a bulk cargo hold typically are made of steel plate, welded at edges and intersections.

The internal wall surfaces of a bulk cargo hold are subjected to at least some of the same stressful environmental conditions as is the outer surface of the vessel hull. In fact, due to the reactive or corrosive nature of some bulk materials transported, e.g., rock salt, and the confined space, the environmental stress on the wall surfaces of a bulk cargo hold can cause surface deterioration at a greater rate than is experienced by the exterior of the vessel hull. Therefore, for lengthening the economic life of the cargo vessel and keeping it in good repair, the internal surfaces of each bulk cargo hold are best cleaned and coated when the vessel is new, and then periodically recleaned and recoated.

It is possible, when fabricating a new bulk cargo vessel, to clean and coat at least some of the plates that will form respective parts of the hull and holds prior to welding the sheets together to provide the respective walls, and then, after welding, to more simply clean or reclean and coat or recoat the areas at and bordering the welded seams. There is a particularly attractive style of work if the coating being provided is a reactive (e.g., "epoxy") coating whether applied by dipping, rolling or spraying.

However, in many instances, the hold wall surfaces, like the vessel hull exterior surfaces, of a new vessel being built, are cleaned and coated entirely after cutting, welding, bolting and installation of at least some fittings have been conducted.

In both the latter instance of such new manufacture, and in ship repair and refurbishment, it has heretofore been a common practice to clean and coat the hold walls (a term which is used herein to include sidewalls whether provided by hull surfaces, longitudinal bulkhead surfaces, transverse bulkhead surfaces, the top sides of hull bottom walls and the undersides of hatch covers), using portable staging temporarily erected in the hold, possibly supplemented or replaced by use of a mobile "cherry picker" type of operator-lift temporarily lowered into the hold.

Surface cleaning typically involves forcibly impacting particles of an abrasive material ("grit") against the surface which is to be cleaned. In some instances, the particles are simply sprayed in a blast of compressed air, issuing through a hose and out of a nozzle pointed at the work surface by a human operator who is wearing protective clothing and breathing gear. In other instances, the similarly attired worker uses a pneumatically or gravity-fed centrifugal impeller the outlet opening of which they direct against the work surface.

As the abrasive grit impacts against the surface to be cleaned, it abrades away whatever is most vulnerable to its attack, principally scale, rust, caked-on remainder of former cargoes, and what remains from prior coatings applied, as affected by the environment since application. It is an operator's responsibility when abrasive blasting, to continue working on a local region of the surface, until substantially all that is 'bad' is gone, but without substantially eating into what is 'good', and then moving on, to the cleaning of an adjacent or next region of the surface.

The spent grit, therefore, contains not only the material impelled against the surface, as affected by the impact, but also the removal material, all mixed together. In some instances, the work head includes a spent-grit recovery mechanism, such as an underlying catch basin or funnel and suction line, so that the abrasive blasting is conducted as a clean-up-as-you-go operation. In other instances, the spent grit simply falls to the floor, i.e., the upper surface of the bottom wall, and onto the predominately upwardly facing surfaces of staging and equipment, and is swept up, vacuumed up or otherwise collected by workers working in support of the blasting operators.

In some instances, the grit is made of sharp-grained particles of refractory material such as carborundum or agate; in other instances, it is made of hard, sharp fragments of ferromagnetic material, including bits or balls of steel. In such instances, collecting the ferromagnetic component of the spent grit separately from fragments of coating and other debris is possible, using magnetic or electromagnetic collectors or separators.

Spent grit can be fractionated and the various fractions subjected to differing benefaction, disposal and re-use procedures.

Coatings following cleanings are typically applied by spraying. Generally, these are made of what a non-technical person, and often a person in the trade speaking colloquially would call 'paint'.

The current trend in coatings, is to ones which include as the vehicle or medium which enables and facilitates application, spreading and continuity of layering, yet upon completion of its contribution to the process, generates a minimum of volatile organic compounds available to escape into the air and, therefore, needing to be contained, abated, combusted or otherwise dealt with.

The staging conventionally used in holds for worker support while conducting cleaning and painting operations, typically is conventional construction scaffolding, which includes many modular sections of framework, and planking. In one sense it is convenient to use such staging, because one set of component parts can be assembled in many different combinations, in order to enable work on holds having various lengths, widths, heights and physical intrusions. However, set-up and tear-down are time consuming, and worker error in securing planks, climbing on scaffolding and dropping parts unfortunately results in accidents and injury. And, each shift of work and each set-up and tear-down involves claimbering on the scaffolding, often while carrying heavy equipment. Blasting and coating equipment needs to be assembled and taken apart, including pneumatic and liquid-delivery hoses, and electric cabling.

The copending U.S. patent application of Goldbach, application Ser. No. 08/802,676, filed Feb.19, 1997 discloses an apparatus and method for cleaning and painting the sidewalls of a cargo hold of a bulk carrier vessel, using a vertical tower supported on the floor of the hold for being shifted in a horizontal plane. The tower supports a vertically movable trolley which, in turn, supports a horizontally shiftable, hollow rectangular, work platform which is ringed by a track. In use, the tower, trolley and platform are respectively positioned and repositioned, by shifting the above-mentioned components, in order to position and reposition a respective two runs of the track which meet at a respective corner, into various corners of the hold, at various heights, so that a worker, or a plurality of workers, operating blast cleaning and paint applicators from the respective track runs, can clean and paint virtually all of the sidewalls of the hold, whereupon the device can be lifted from the hold and lowered into another hold for performing like operations on the sidewalls of the other hold. Supply lines for grit, paint, compressed air and for ventilating the workspace are disclosed.

The copending U.S. patent application of Goldbach, application Ser. No. 08/806,097, filed Feb. 25, 1997, discloses, in addition, a remotely operable work head mountable to tracks extending along outer side rails of the work platform, so that the human workers can attend to performing the cleaning and painting operations without needing to physically support the cleaning and painting machine nozzles (against gravitational weight and against reaction or rebound forces due to energetic contact of the impelled abrasive grit and sprayed paint against the ship hold sidewall surfaces).

The present invention extends the usefulness of the self-contained device for cleaning and coating hold surfaces in a bulk carrier, including modifications to and elaborations upon the apparatus and methods disclosed in Goldbach et al applications Ser. Nos. 08/802,676 and 08/806,097.

SUMMARY OF THE INVENTION

Each of a plurality of cargo holds of a bulk carrier vessel has a self-contained staging system lowered into it, form the platform track of which workers operate semi-automatic blasting machines that are mounted onto the platform. The set-up for each vessel also includes for each hold a ventilation unit provided on a hatch plug, and a transporter for the staging system. Groups of staging systems are served by on-deck air compressors. Staging systems actually engaging in blasting are served by recycling shot blast units which recycle and supply an abrasive, preferably steel shot. Following blast cleaning, the cleaned surfaces can be painted from the platforms.

BRIEF DESCRIPTION OF THE DRAWINGS

The principles of the invention will be further discussed with reference to the drawings wherein (a) preferred embodiment is shown. The specifics illustrated in the drawings are intended to exemplify, rather than limit, aspects of the invention as defined in the claims.

FIG. 1 is a schematic top plan view of a bulk carrier vessel having seven holds, six of which are shown having self-contained staging modules received therein, and three of which are shown having shot-blast and vacuum modules received therein:

FIG. 2 is a schematic side elevational view of the vessel depicted in FIG. 1, with part of the near sidewall of the hull and the near sidewalls of the cargo holds broken away to show the self-contained staging modules and shot-blast and vacuum modules;

FIG. 3 is a transverse vertical cross-sectional view on line 3—3 of FIG. 1;

FIG. 4 is a transverse vertical cross-sectional view on line 4—4 of FIG. 1;

FIGS. 12–14 are fragmentary top plan views of the self-contained staging module, showing one shot blast nozzle respectively in a fully retracted, a fully extended and an intermediate position;

FIGS. 15–17 are fragmentary side elevational views of the self-contained staging module, showing one shot blast nozzle armed maximally downwards, e.g. for cleaning the slanted surface of a lower wing tank portion of a hold sidewall, aimed maximally upwards, e.g. for cleaning the slanted surface of an upper wing tank portion of a hold sidewall, and aimed horizontally, e.g. for cleaning a vertically oriented portion of a hold sidewall;

FIG. 18 is a top plan view of a transporter for a self-contained staging module;

FIG. 19 is a side elevational view of the transporter;

FIG. 20 is an end elevational view of the transporter;

FIG. 21 is a side elevational view of a shot-blast and vacuum module;

FIG. 22 is a front elevational view of the shot-blast and vacuum module;

FIGS. 23–26 are schematic top plan views of the four levels of the shot-blast and vacuum module, these views showing successively lower levels of the module shown in FIGS. 12 and 13;

FIG. 27 is a fragmentary top plan view of the vessel of FIG. 1, showing a ventilation and compressor deck arrangement;

FIG. 28 is a transverse vertical sectional view of a hold of the vessel showing the arrangement of FIG. 27, together with a self-contained staging module and a shot-blast and vacuum module;

FIG. 29 is a fragmentary side-elevational view of the ventilation and compressor deck arrangement;

FIGS. 30–35 are detail views of a deck plug for controlling ingress and egress in regard to the hold being subjected to cleaning and coating, FIG. 32 being a fragmentary sectional view on line 32—32 of FIG. 31, FIG. 33 being a fragmentary sectional view on line 33—33 of FIG. 31, and FIG. 34 being a fragmentary sectional view on line 34—34 of FIG. 31;

FIG. 40 is a diagram of a schedule for cleaning and coating the vessel of FIG. 1 using the apparatus and method of the present invention.

DETAILED DESCRIPTION

Figure 5:
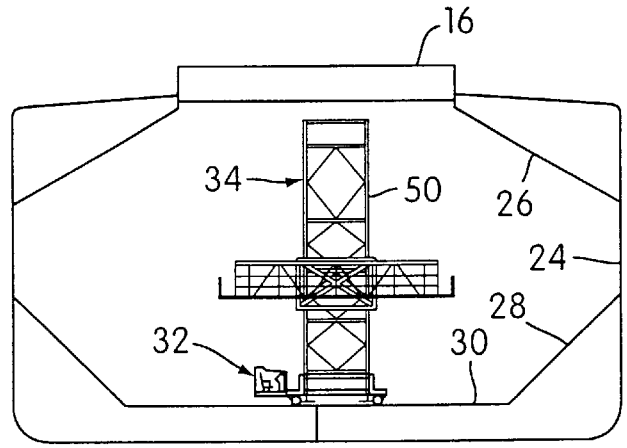
FIGS. 5–7 are larger scale vertical cross-sectional views of a typical hold of the vessel, respectively showing a self-contained staging module as moved by its supporting transporter respectively to a midship position, a port position and a starboard position.
Figure 6:
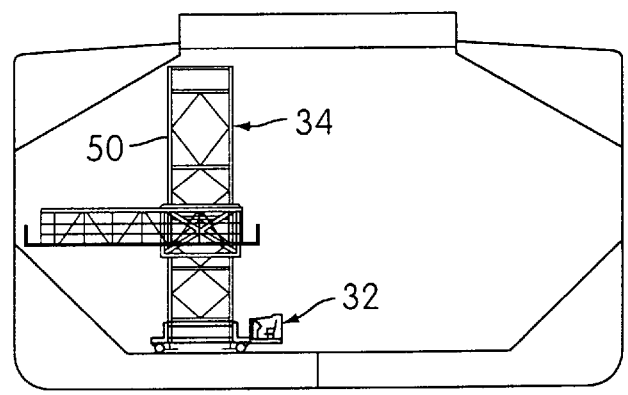
Figure 7:
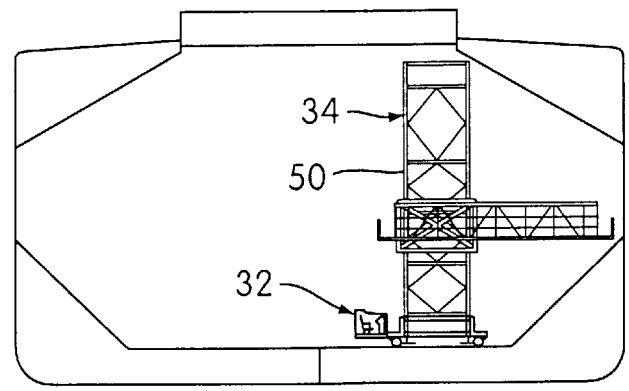
Figure 8:
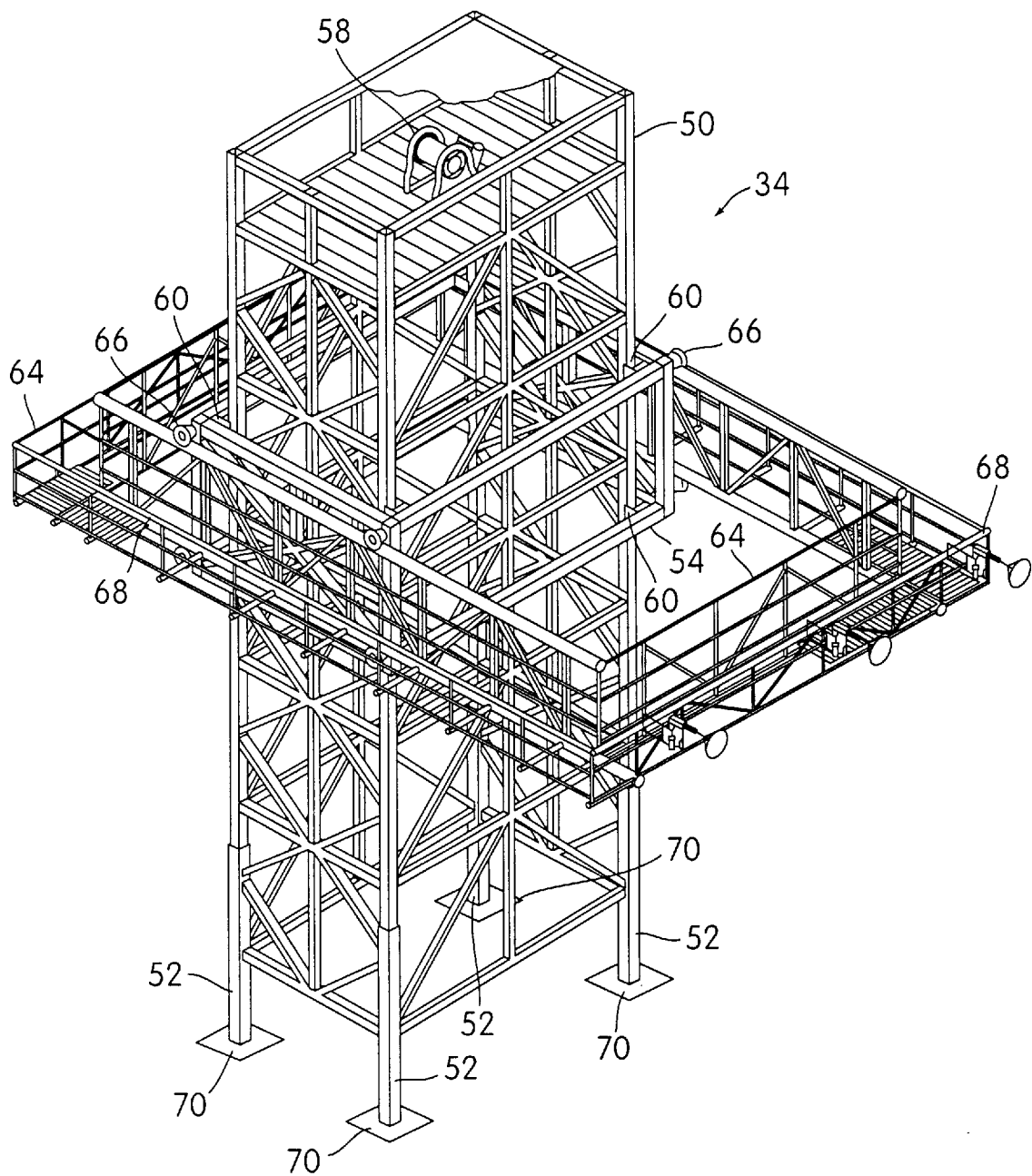
FIG. 8 is a perspective view of the self-contained staging module (supported in this showing, on its jacking feet, the supporting transporter not being illustrated in this view)
Figure 9:
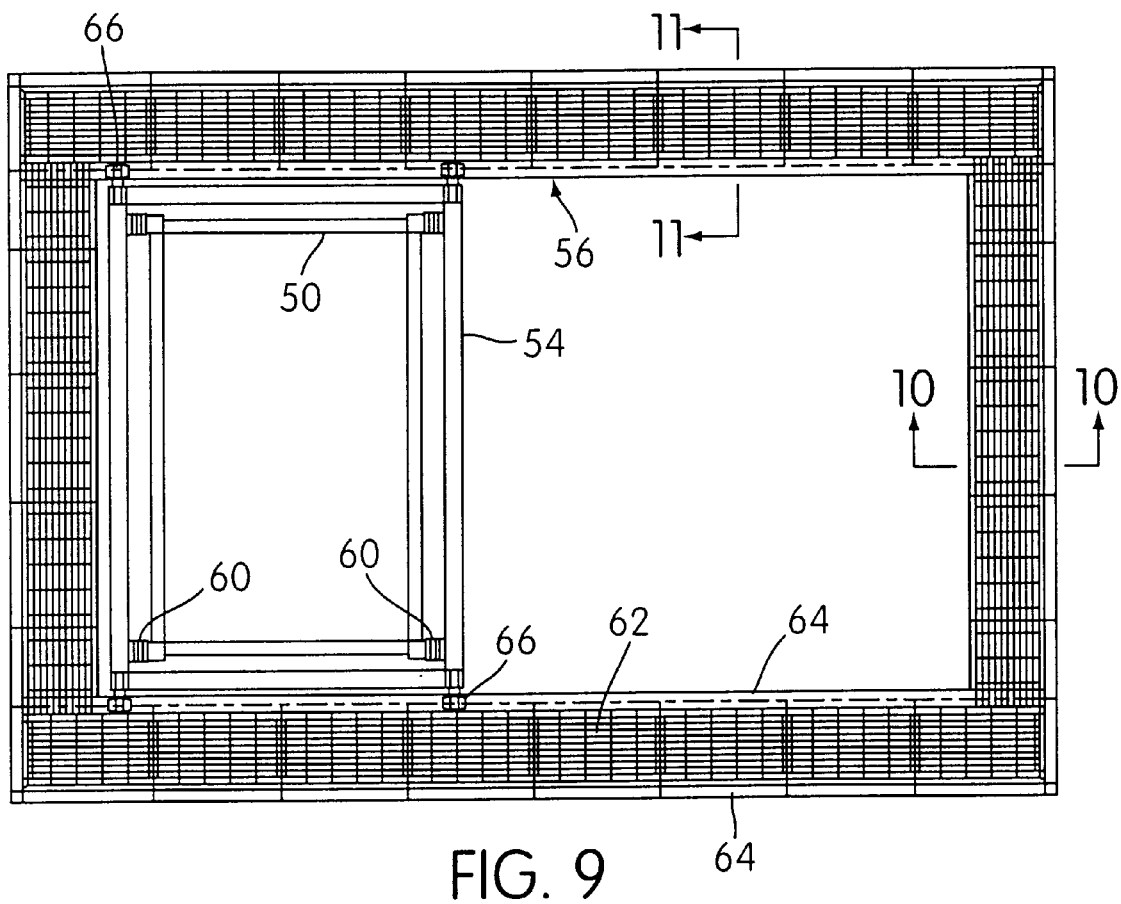
FIG. 9 is a schematic top plan view of the self-contained staging module.
Figure 10:
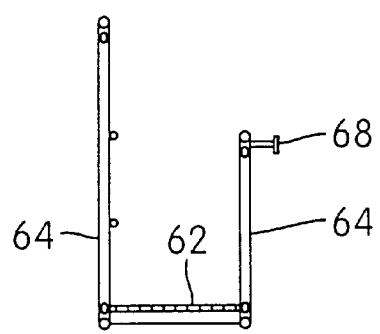
FIGS. 10 and 11 are fragmentary vertical cross-sectional views respectively on lines 10—10 and 11—11 of FIG. 9.
Figure 11:
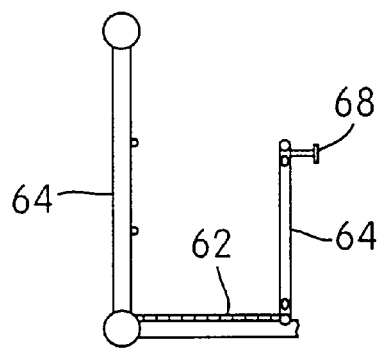

A preferred embodiment of the invention is described herein using as an example the cleaning and coating (e.g. painting) of the seven holds of a 60,000 dwt bulk carrier having 23,410 square meters of total hold surface area. It is projected that this operation, when using a full shipset of equipment provided in accordance with principles of the present invention, cleaning and coating can be accomplished within nine working days, using two 50-worker crews, each working twelve-hour shifts, and including washing the holds prior to commencing blasting, performing commercial-quality surface preparation, and performing a coating operation which includes applying one coat of primer, a stripe coat and a finish coat.

One shipset of equipment for cleaning and coating the bulk carrier cargo holds, in the example under discussion, includes as major components six self-contained staging modules, six ventilation and air-treatment set-ups, six transporters, three recycling shot blast units. A complement of thirty semi-automatic open blasting machines is provided for installation on the staging modules. Other implementations of the method described below can use more, or fewer of the various components, and be used for working on various sizes of vessels.

In addition, implementing the cleaning and coating method described below using the equipment described below requires the furnishing of certain services which, in a usual implementation, is provided by the shipyard where the method is being performed. Typically, the needed shipyard services include: crane and rigging services, electrical power (typically 6300 kva @ 380 v/50 hz/3-phase), and steam (typically 12,090 kg/hr @ 390 kg/m$^2$).

In FIGS. 1–7, a bulk cargo vessel 10 is depicted, having a hull 12 and a deck 14, through which a plurality of (in the instance depicted seven) hatch openings 16 provide access to respective cargo holds 18 having longitudinal sidewalls 20 and transverse bulkhead walls 22. In the instance depicted, the walls 22 are substantially vertical, and the walls 20 have substantially vertical central portions 24 which are located between sloping upper and lower portions 26, 28. Each hold further has a generally horizontal deck, floor or bottom wall 30 (which usually is the upper wall of an underlying tank, now shown).

In FIG. 2, the holds are shown numbered from 1 to 7, from bow to stern. In FIG. 1, six set-ups of equipment for practicing the invention are shown related to the cargo holds as follows: hold 1, none; hold 2, set-up #6; hold 3, set-up #3; hold 4, set-up #5; hold 5, set-up #2; hold 6, set-up #4; and hold 7, set-up #1.

Figure 40:
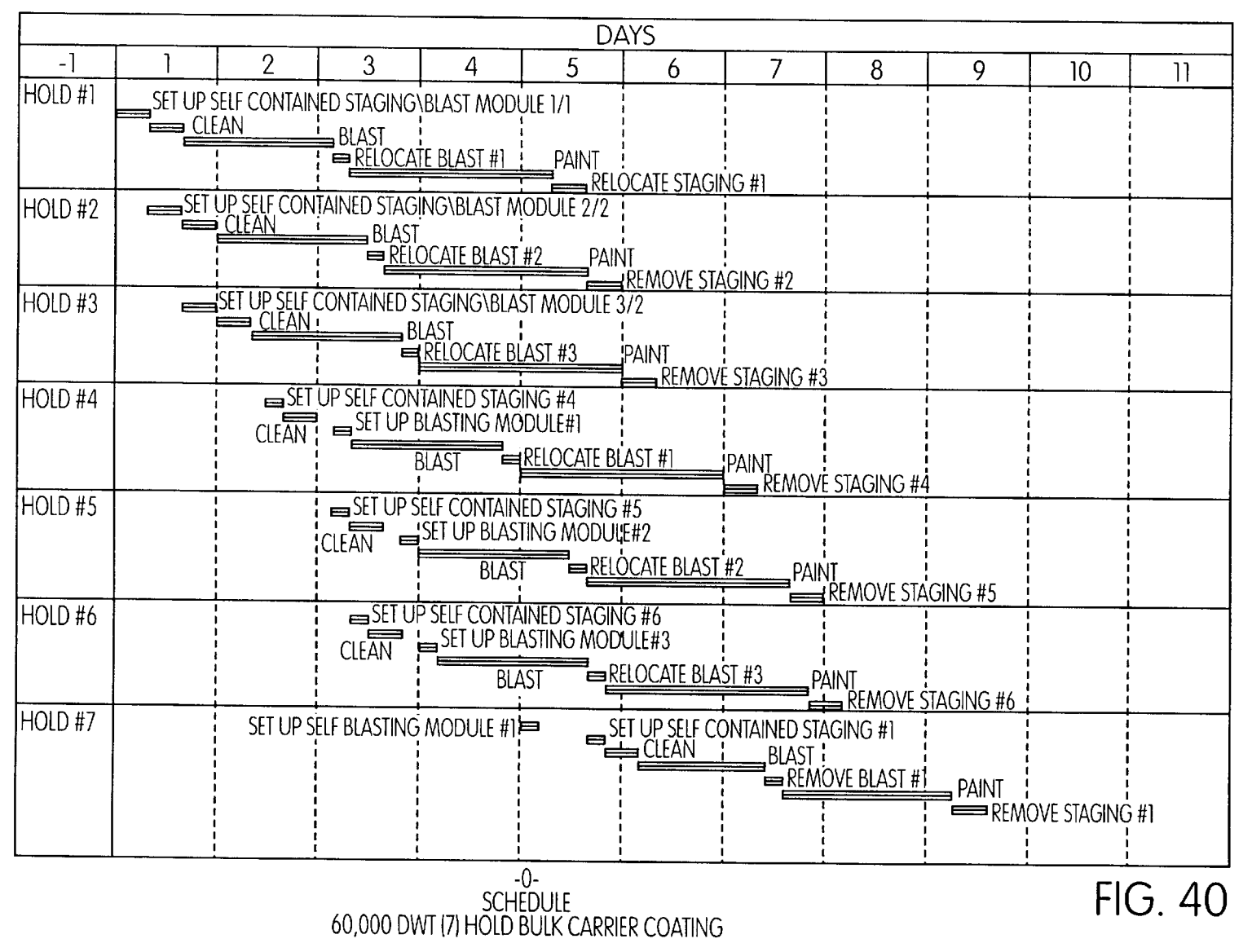

A schedule for cleaning and coating the holds 1–7 is shown in FIG. 40. Inasmuch as the schedule indicates repetition of steps in a cascading progression, this detailed description includes information for selected practices, as representative of a full set.

At the first three holds to be coated (set-ups #1–3), respective transporters 32 (FIGS. 18–20), self-contained staging modules 34 (FIGS. 5–17) and shot-blast units 36 (FIGS. 21–26) are placed inside the respective holds, and respective ventilation set-ups 38 and air compressors 40 (FIGS. 27–35) are arranged on the deck 14 adjacent to each respective hatch opening 16. Set-ups #4–6 are provided with transporters 32, self-contained staging modules 34 and ventilation set-ups 38.

The transporters 32 are placed first, to aid in locating the equipment in the respective holds.

As shows best in FIGS. 1 and 2, and can be understood from FIG. 40, set-ups #1–3 are interspersed with set-ups #4–6 (in a progression 1, 4, 2, 5, 3, 6), in order to reduce the need for equipment-handling between holds.

In a preferred practice, the smallest hold, which usually is the forward one, is cleaned and coated last.

Each set-up is completely outfitted in turn, so that work can commence immediately, and equipment can be moved in sequence as work is completed.

By preference, each self-contained staging module 34 is equipped with five semi-automatic open blasting machines 42 (FIGS. 12–17), in order to avoid the need to move the machines from staging module to staging module.

By preference, all of the equipment is placed and moved using shipyard cranes (not shown). After the initial placement, the only crane service required is for the relocations and removals indicated in FIG. 40.

The transporters 32 are each used for moving a respective self-contained staging module 34 and a respective recycling shot-blast unit 36 to different locations within the respective cargo hold 18. By preference, the transporters 32 are diesel-hydraulic powered (at 44), with lift cylinders 46 and planetary hydraulically driven solid tires 48. The tires are sized for providing loadings on the bottom wall 30, i.e. on the ship tank top, that remain safe when a transporter is lifting the heaviest component (usually a fully loaded recycling shot-blast unit 36). Typically, each transporter 32 has a seventy metric ton lifting capacity and weighs twenty metric tons.

For shifting the self-contained staging module 34 and recycling shot-blast unit from place to place on the bottom wall 30 of a respective hole 18, a transporter 32, in a vertically retracted condition, is run under the item needing to be moved, vertically extended to lift the unit, run to the intended new position of unit, and vertically retracted so that the item comes to rest at its new position on the bottom wall. The transporter 32 is sufficiently multidirectionally mobile that it can place a unit in any desired position (including the capability of shifting a respective self-contained staging module 34 from corner to corner into all four corners of a hold).

The self-contained staging module 34 for cleaning and coating the hold surfaces 20–28 is sufficiently small in horizontal cross-sectional outline that it can be lowered through the smallest hatch into and raised out of a hold of the least accommodating vessel on which it is expected to be used, yet sufficiently large in horizontal cross-sectional outline, and extensibility, that preferably, workers working from it, can reach all of the internal sidewall surfaces of the hold with no more than four moves of the device (i.e., into the four corners of the hold). In other words, its width (including extensibility) preferably is somewhat greater than half the port-starboard dimension of the widest hold in which it will be used, and its depth (including extensibility) preferably is somewhat greater than half the longitudinal dimension of the longest hold (in the bow-to-stern direction of the vessel) in which it will be used. The height (including exchangeability of tower sections) preferably is sufficiently great to permit workers to reach the upper extents of the sidewalls, to clean and coat the underside of the hatch cover or hatch covers, if desired, and yet sufficiently short to permit the hatch cover(s) to be closed as cleaning and coating proceeds, in order to confine the airspace within which cleaning and coating operations are being conducted, thereby facilitating air quality management.

The self-contained staging module 34 is shown including three major components, namely, a vertical tower 50 having leveling, jacking feet 52 at its base, a vertical trolley 54 which is supported on the vertical tower and subject to being raised and lowered and stationed at any desired height on the vertical tower, and a horizontal trolley 56 which is supported on the vertical trolley 54 and subject to being centered and bidirectionally shifted (typically maximally to starboard and maximally to port, although the entire device, if lowered into the hold at ninety degrees about a vertical axis to the orientation depicted, would enable shifting of the horizontal trolley, instead, maximally forwards and maximally aft).

The vertical tower 50 preferably is a four-sided structure fabricated of structural steel members (ideally, tubular ones) bolted, welded or otherwise connected, possibly in two or more modules which are stackably connected (in order to provide for working in holds of varying height).

The vertical tower 50 preferably is rectangular in plan and elevation, for example, 13–19 meters high, 8–12 meters wide and 3 meters deep (in the fore to aft direction of the ship); in feet, these preferred dimensions are 40–60 feet tall, 25–35 feet wide and 10 feet deep.

The vertical tower 50, when being shifted, is supported at its base, i.e., the tower feet are caused to be elevated above the bottom wall 30 by, a respective transporting 32 which is operable to cause the tower (and, therefore, the entire module 34) to be horizontally shifted, at least in two mutually orthogonal directions (widthwise and lengthwise of the ship).

Also mounted to the vertical tower 50 at or near its base (i.e., on the lower section, if the tower is provided as stackable modules) is a full complement of supply and support systems (not shown), typically including an electrical distribution system, and distributing piping for compressed air, breathing air, abrasive grit, and paint. The electrical power supply cabling and distribution piping extend from the supply and support systems, to the vicinity of where on the module 34 the service is needed. In instance where the tower is constructed of modular sections, the supply cabling and distribution piping preferably include connectors that are easily made-up and taken apart at the interfaces of the sections. And the modular sections are made to have easily vertically made-up, easily vertically separated mechanical connectors for respective tower framing elements (e.g., complementary tapering pins and flaring sockets), so that stacking, de-stacking, and lifting and lowering by crane is easy to accomplish if a crane having sufficient capacity to lift a whole module 34 is unavailable. Locking together of respective tower framing elements of stacked module sections can be provided, for providing added assurance against partial separation and tilting of an upper module section when the vertical trolley is relatively highly elevated, the horizontal trolley is relatively extremely extended, and heavy workers and equipment are supported on the horizontal trolley relatively far from the vertical tower.

If the vertical tower 50 is provided as stacked module sections, it is currently preferred that the device 34 as a whole be provided as at least two sections, namely a lower section including the base of the vertical tower 50, supply and support systems including lower portions of the electrical cables and pipes, and an upper section (or an intermediate and an upper section) of the vertical tower 50, the vertical trolley 54, a hoist mechanism 58 for the vertical trolley 54, the horizontal trolley 56, an extension-retraction mechanism for the horizontal trolley, and upper portions of the electrical cables and pipes.

By preference, the electrical distribution cabling and grit, air and coating piping extends from the base, up through the inside of the vertical tower 50 to its top, with take-offs (i.e., connectors for easily and disconnectably making-up and breaking-down connections) at periodic intervals, such as each 2.5 meters (in feet, each 8 feet).

By preference, two ladders (not shown) extend the full height of the vertical tower 50, provided on the fore and aft sides of the tower framework (which is only rudimentarily shown in the drawings), complete with a safety cage around the envelope of movement of a climbing user.

In any event, the vertical tower is constructed, assembled and supported to be stable and free-standing even when the horizontal trolley is in an extreme position and fully loaded.

The vertical trolley 54 likewise preferably is a rectangular parallelepipedal framework fabricated of high strength steel members bolted and/or welded or otherwise connected together, having roller elements 60 arranged to rollingly engage respective vertical elements of the vertical tower 50. The vertical trolley 54 can be lowered onto and lifted off of the upper end of the vertical tower 50, should the need arise. The hoist mechanism 58 may be located with the supply and support systems on the base of the lower section of the vertical tower 50, or fit over and be supported on the upper end of the vertical tower 50.

The rollers 60 of the vertical trolley preferably include internal rollers, as well as external rollers, in upper and lower sets, at all four corners of the tower, in order to accommodate the port-starboard and forward-aft forces which are experienced as equipment and personnel move around on the device, and the powered trucks of the transporter 32, the hoist 58 and horizontal trolley extension-retraction system are operated.

The choice of which of the subsystems serving the module 34 to operate using compressed air, possibly hydraulic power, or electrical power can be varied depending on local preferences, requirements and availabilities. For instance, the motor for the winch for the cables which support the vertical trolley from the hoist mechanism could be an electrical motor, an air-operated motor or a hydraulic motor.

The horizontal trolley 56 likewise is a rectangular framework fabricated of preferably high strength structural steel elements. It is supported on the vertical trolley 54 for bidirectional rolling or sliding movement in a horizontal plane between a neutral position (FIG. 5) and two opposite extreme positions (FIGS. 6 and 7), by a suitable extension-retraction system (not shown) (which may be a rack and gear; chain and sprocket; hydraulically or pneumatically operated extensible-retractable cylinders or the like, provided (like the vertical trolley 54) with suitable means for locking the trolley 56 in any achieved position, despite bursting of a supply hose, or other failure of the system for changing the position of the trolley).

The horizontal trolley 56, as seen from above, preferably includes a walkway 62 made of open grating or expanded metal mesh for decking, which extends about all four sides of the outer perimeter of the horizontal trolley 56. The walkway 62 is rimmed inside and out by an upstanding safety rail 64.

The metal framing elements of the self-contained staging module 34 need not all be made of the same type of steel alloy. For instance, the horizontal trolley 56, because it is located closest to where the most-abrasive activity is occurring in use, can be made in whole or in part of high yield steel having greater resistance, in order to provide durability yet lightness in weight, while other parts can be made of less expensive alloy.

It is presently preferred that the framework of each self-contained staging module 34 be primarily constructed of tube steel (ASTM A500, Grade B, 46 ksi yield), with open grating walkways. These materials have been selected so as to reduce the amount of surfaces available for shelving of blast media, to provide relatively lightweight construction, and to make use of materials that are both readily available and easily reparable in a shipyard environment. By preference, a module 34 is designed to support 2.75 metric tons of live load at any location on the work platform provided by the horizontal trolley 56, walkway 62 and safety rail 64.

Each self-contained staging module 34 is designed to be lowered into a ship's hold 18 for commencing work, using a conventional shipyard crane (not shown). In the preferred embodiment, each self-contained staging module 34 weighs forty-five metric tons. By preference, each staging module 34 is so constituted as to be easily disassembled into a plurality of major components for placement of the module 34 into and removal of the module 34 from a hold 18, if sufficient crane capacity to lift each module 34 as a whole is unavailable.

Once inside a hold 18, a respective module 34 is shifted into position, and from one position to the next, using a transporter 32.

Figure 38:
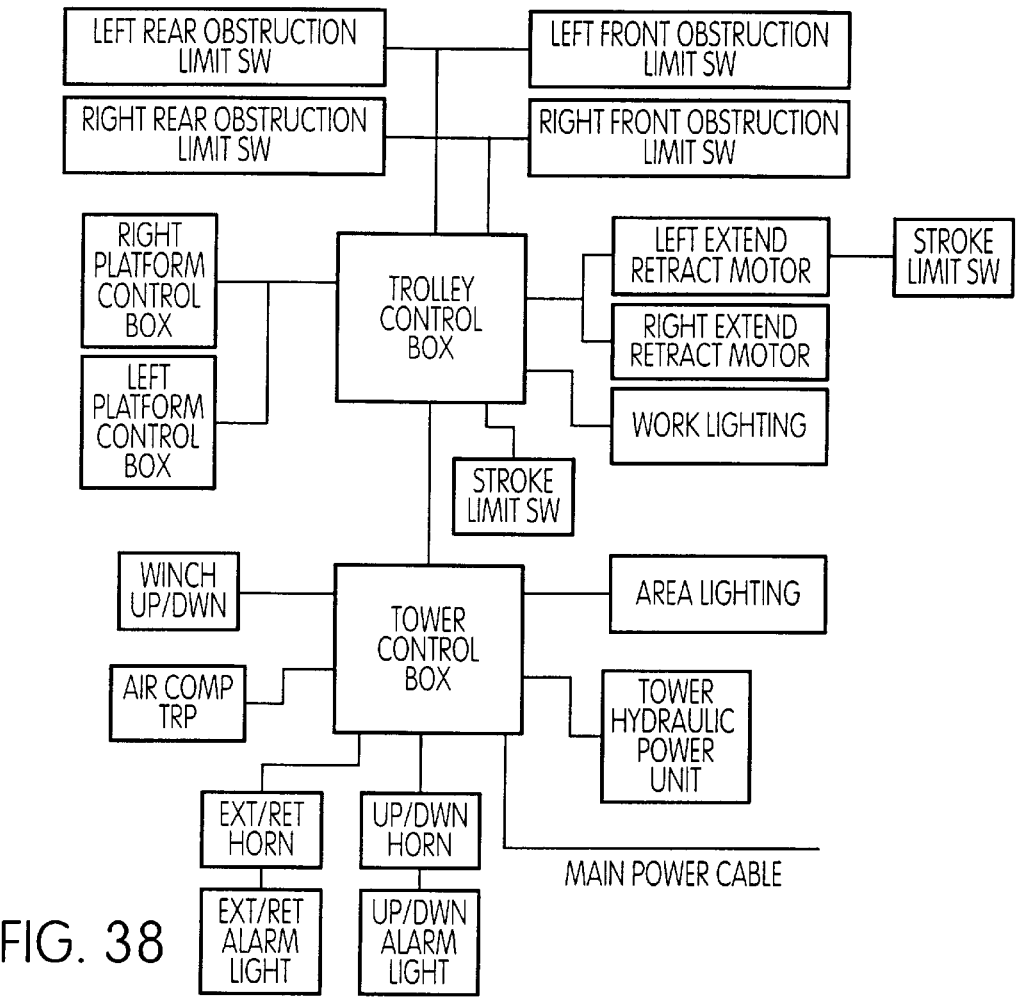
FIG. 38 is a schematic diagram of the control system for a self-contained staging module.
Figure 39:
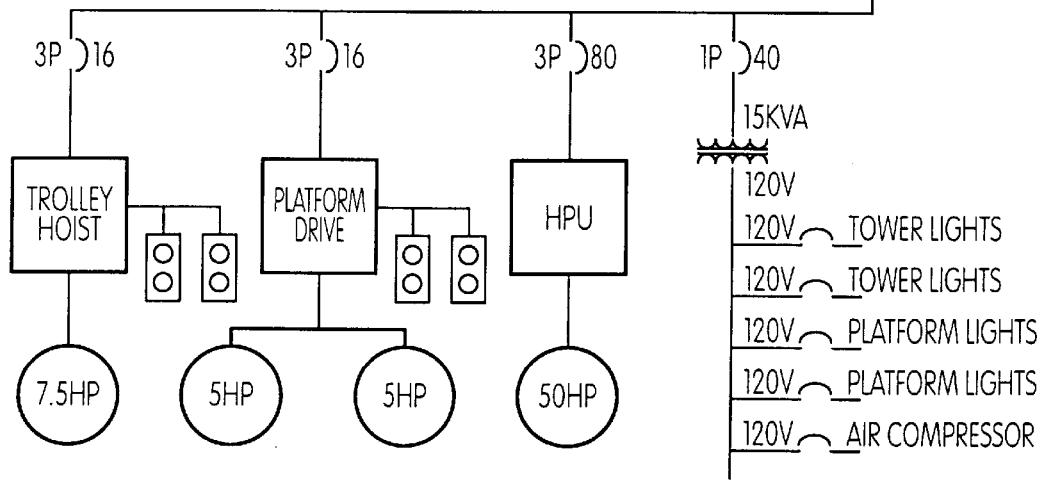
FIG. 39 is a schematic diagram of the power system for a self-contained staging module.

By preference, each module 34 is self-contained, although requiring supplies of services. For instance, each module 34 is preferably provided with a combination of electrically powered flood and adjustable spot lights and other electrically powered equipment, as schematically illustrated in FIGS. 38 and 39. Main electrical supply to each module 34 is, in the preferred embodiment, 100 KVA, supplied through an umbilical cord connected to shipyard services at the top of the vessel 10.

In the preferred embodiment, the work platform including the horizontal trolley 56, the walkway 62 and the safety rail 64, is 8.8 m wide and 12.6 in long. The walkway itself preferably is 0.76 m wide in each of its four runs. The platform, supported by eight rollers 66, is able to shift in a horizontal plane a distance of, e.g., 6.4 m, powered by two rack and pinion assemblies driven, e.g., by respective five-horsepower gearmotor drives. The racks of these drives can be mounted on the upper chord of the main platform truss, and the gear drives can be mounted on the trolley. By preference, the gearmotors have variable speed drives, with electric brakes, and are arranged similar to conventional portal crane drives. The controls for operating the platform and the trolley preferably are mounted on the vertical trolley 54 but are accessed from the platform.

The platform, which in the preferred embodiment weights approximately 7.9 metric tons, has on its outer rail 64, a T-bar track 68 on which the semi-automatic open blasting machines 42 are mounted.

The vertical trolley 54 is raised and lowered, e.g. 12.8 meters, by cables (not shown) attached to the hoist 58. The hoisting system preferably is designed in accordance with the safety regulations applicable to manlifts and includes a pawl (not shown) at each lift point, which engages a sawtooth rack mounted on the tower, for preventing uncontrolled descent of the vertical trolley and platform in the event of breakage of a winching cable. By preference, the hoist winch 58 includes brakes which are released by applying compressed air supplied by a small air compressor (not shown) located on the tower near the winch. The weight of the vertical trolley, in the preferred embodiment, is about 4.8 metric tons.

The tower 50 preferably is 3.4 m wide, 5.4 m deep and 15.3 m high. Its legs are at their bases provided with jacking feet 52 equipped with hydraulic jacks which are capable of automatically operating to keep the tower plumb, and can be extended for permitting workers, working from the tower top level, to reach the coamings of the hatch of the hold in which the module is installed. Each jack 52 has a square pad 70 connected to the remainder of the jack by a flexible joint, for spreading the load of the module over the vessel tank top (i.e. hold floor or bottom wall) 30, and a locking collar (not shown in detail) to prevent slippage. The hydraulic power unit and controls for the jacking system preferably are self-contained and are installed on the lower level of the tower.

Each tower 50, in the preferred embodiment, has seven levels, of which the first (lowest) contains the hydraulic power unit for the jacking system; the sixth (next to topmost) level mounts the winch 58; and the seventh (topmost) level preferably is clear of equipment, but is decked-over, so as to permit worker-access under the hatch covers and main deck. In the preferred embodiment, the weight of the tower 50 is approximately 32.3 metric tons.

Although it would be possible to provide the equipment for supplying and recycling the abrasive material used for blast-cleaning the hold surfaces on the ship deck, or on the dry-dock deck, or on a wingwall of the dry-dock, or on a barge moored alongside the dry-dock, or on the tower 50, it is presently preferred that these services be provided for each self-contained staging module, by a separate recycling shot blast unit 36 (shown in most detail in FIGS. 21–26, in which various functional parts are shown verbally labeled).

Each unit 36 includes a multi-level framework tower 72, and is capable of simultaneously supplying abrasive shot or grit to blasters who are at work cleaning a segment of the hold walls, and supplying suction and classification for the use of workers who, using vacuuming hoses and/or electromagnetic spent shot pick-up machines emptying into collection hoppers, are retrieving for recycling the mixture of spent abrasive, scale, flakes of removed coating, and debris which fall to the tank top 30 during the cleaning operation.

In the preferred embodiment, each recycling shot-blast unit 36 is capable of supporting concurrent blasting and vacuuming, and has sufficient storage and recycling capacity for serving in support of three hours of blasting without needing any replenishment of on-board supplies. By preference, each recycling shot-blast unit 36 is of sufficient size and capacity to support eight blasters, using 13 mm nozzles, at a grit consumption of 0.82 metric tons per hour per blaster. The work of the eight blasters preferably is complemented by the work of four scavenging operators, who, using vacuuming hoses, and/or other retrieval equipment, pick-up the mixture of spent abrasive, and removed paint, scale and other debris (hereinafter spent abrasive mixture) which falls to the deck 30 as a consequence of the blasting being conducted. In the preferred embodiment, the shot-blast unit supplies vacuum at 5000 cfm, at 27 inches Hg, via a system driven by a 350 Hp electric motor. A typical unit 36 weighs 36.8 metric tons when empty of shot and spent abrasive mixture, and 65.8 tons when fully loaded. The compressed air (typically a minimum of 2800 cfm) which is needed for powering the blasters, is provided from the respective air compressor 40 located on the main deck 14 of the vessel 10.

Each recycling shot-blast unit 36, in the preferred embodiment shown, comprises a framework tower 72 which is generally rectangular in plan and elevation, having five levels, of which all five are illustrated in FIGS. 21 and 22, and levels 1–4 are shown respectively in plan in FIGS. 26, 25, 24 and 23.

The layout which is shown is typical and preferred; other layouts are possible. In the layout depicted, the tower has four legs 74, one at each corner, and the level 1 is sufficiently elevated by the legs, that the transporter 32, acting as described above in relation to a module 34 is able to shift the unit 36 about the landscape of the bottom wall 30 of the hold 18, after a crane has lowered the unit 36 into the hold, for keeping the unit 36 out of the way of work being done from the module 34, while positioning the unit in relation to the module 34 such that the unit 36 can effectively serve the module 34.

Level 1 of the unit 36 is shown supporting eight continuous-fill blasting vessels 76, supplied with compressed air via a manifold 78, connected, in use, by a pressurized air line, not shown, to an on-deck compressor 40. Each blasting vessel 76 has its output side connected in use, by a respective blasting hose, not shown, to a respective nozzle (further described later in this description). In use, each blasting vessel 76 is continuously refilled, from above, with abrasive grit (e.g. steel shot) from a shot storage bin 80 on level 2, two bins 80 being shown, each serving a respective four of the blasting vessels 76, via respective supply lines 82.

On level 3, above the shot storage bins 80 a classifier unit 84 is provided, that is shown including a classifier 86 (housing a magnetic separator, vibrating screener/feeder and multi-stage air wash (none of which are depicted in detail), a high vacuum pump 88 (which is powered by a 350 Hp motor, mentioned above), for powering vacuuming hoses (not shown), used by the scavenging workers, and a silencer 90, for quieting the sound that the high vacuum pump 88 would otherwise cause to be audible when in use. Earlier stage equipment for recycling the spent abrasive mixture is shown provided on level 4 of the unit 36, as including a rotating drum debris separator 92, a double dump discharge 94, a cyclone pre-cleaner 96, and a high/low vacuum bag unit 98 served by a fan 100. Rough separation of debris and dust from the spent abrasive mixture supplied to the separator of level 4, results in a benefacted stream of nearly clean abrasive that is forwarded via the line 102 to the classifier unit 84 on level 3 for completion of the benefaction. On board electrical systems for the unit 84 are provided on the uppermost level, level 5, indicated by the legend ELECTRICAL AREA, 104, in FIGS. 21 and 22.

Figure 36:
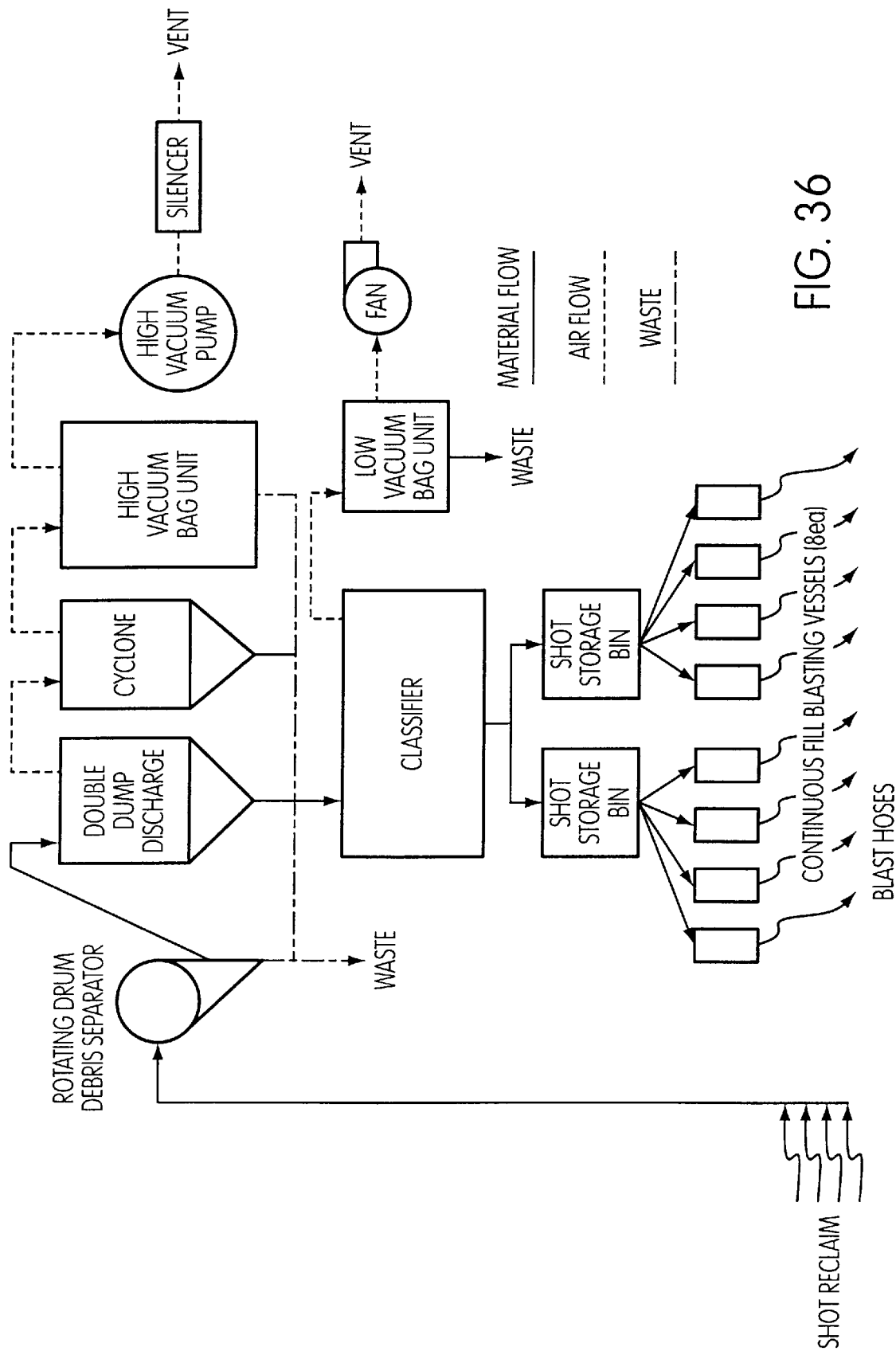
FIG. 36 is a schematic diagram of the flow of shot, air and waste for the shot blasting portion of the system.
Figure 37:
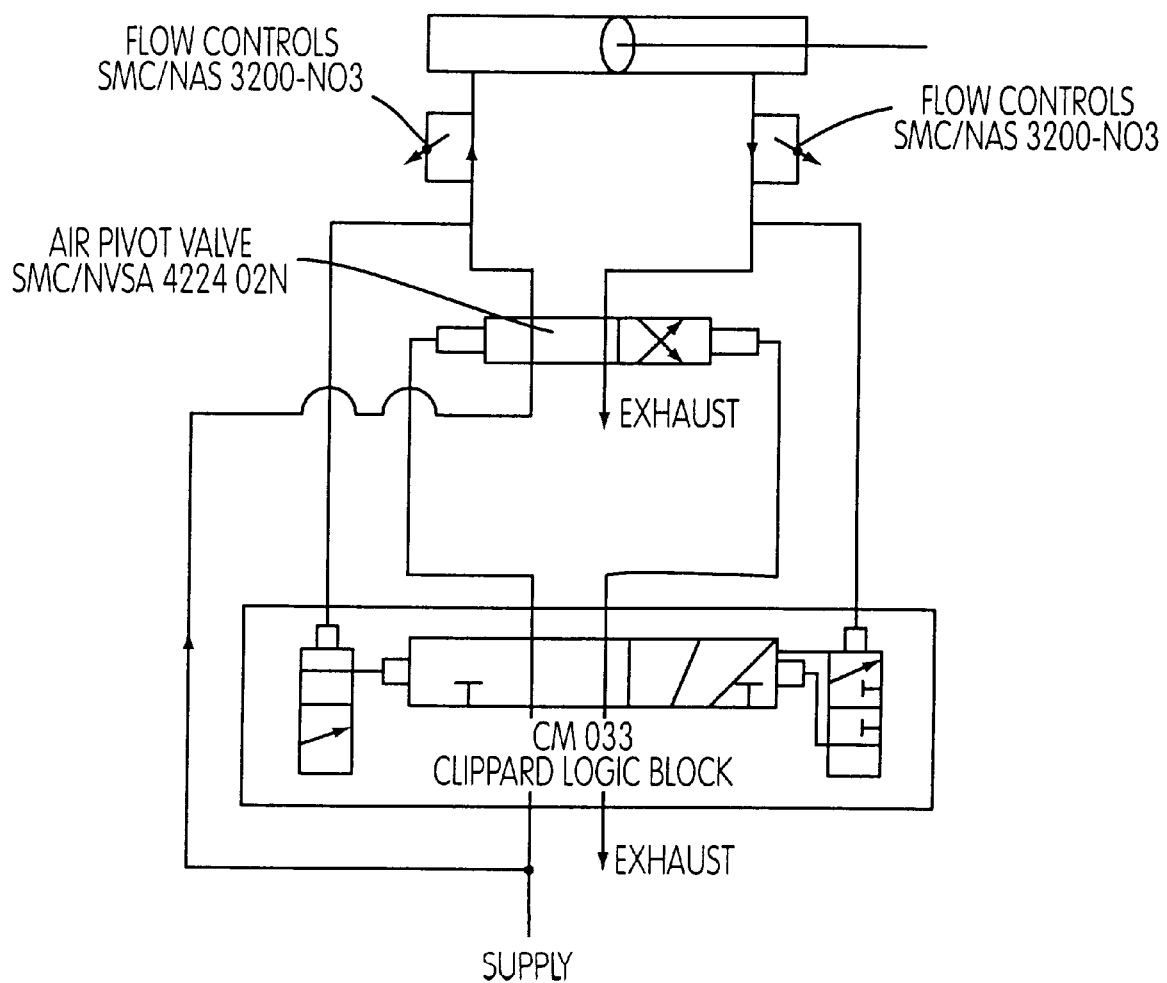
FIG. 37 is a schematic diagram of the air supply for a shot-blast nozzle.

A diagram of material flow, air flow and work flow for a unit 36 is provided in FIG. 36.

A preferred ventilation set-up 38, also known as a ventilation and air treatment module, is shown in FIGS. 27–29 for a typical one of the holds 18 in which cleaning or coating is being accomplished.

Each ventilation set-up 38 is shown including a hatch plug assembly 106, two dehumidifiers 108, two dust collectors 110, and associated ductwork and hoses 112, 122 (not all of which are depicted in detail). The function of the ventilation set-up 38 is to control the environment of the hold where work is being accomplished, both to prevent escape of dust, debris and other airborne consequences of the work being done, and to condition the air within the thereby enclosed space, such that it has an acceptable temperature, humidity and clarity for the work being accomplished.

The hatch plug assembly 106 (more details of a preferred embodiment of which are illustrated in FIGS. 30–35), acts as a physical barrier for the otherwise upwardly open hatch of the hold created by folding or shifting aside the usual cover or covers which normally form the closure or "roof" for at least a central portion of the hold. The hatch plug assembly 106 further provides various ports, openings or access ways, some closed by penetrated ductwork and hoses 112, 122, and others by various closures. The various openings shown include an openable/closeable trash removal hatch 114 out through which separated debris can be removed, openings 116 for compressed air hose penetration, openings 118 for electrical line penetration, openings 120 for penetration of the exhaust hoses 122 to the dust collectors 110, personnel access ports 120, and openings 114 for penetration of the dehumidified air supply hoses 112 from the dehumidifiers 108. In the preferred set up, the dust collectors 110 are used only during blasting, whereas the dehumidifiers 108 are used during both blasting and coating. However, where collection and processing of effluent air while coating (e.g. spray painting) is being conducted is desired or required, the dust collectors 110 can be replaced during coating operations by suitable volatile organic compound combustors or other known air quality-improving equipment.

The hatch plug of the hatch plug assembly 106 preferably is fabricated from steel, and, in the preferred embodiment, weighs approximately 5.5 metric tons. About its perimeter, it provides a rain-tight seal over the hold opening, in cooperation with the hatch covers of the respective hold.

Each of the dehumidifiers 108 may be a commercially available package unit, e.g. a Munter Cargoaire Model HCE-30000-SBA, capable of supplying 30,000 cfm of dehumidified air to the hold. If needed, each dehumidifier can be operated in conjunction with an air heater or chiller (not shown) so that the air in the hold also is acceptable from a thermal standpoint. Each dehumidifier 108 of the preferred embodiment requires 45 KVA electrical service and 2216 lb/hr @ 80 psi stream service, and weighs 11.3 metric tons.

Each of the dust collectors 110 may be a commercially available unit, e.g. on N-Viro, Inc. 36,000 cfm model, which is arranged to remove contaminated air from low in the hold 18 through a respective 1.22 m diameter corrugated plastic duct 122, which is suspended from the hatch plug. Each dues collector 110 of the preferred embodiment requires 124 KVA of electrical power, and 52 cfm of compressed air.

The on-deck compressors 40 are shown including two for each hold where blasting is being done. These are equipped to supply compressed air to the recycling shot blast unit 36, the dust collectors 110, and the semi-automatic open blasting machines 42. A preferred compressor 40 is an Ingersoll-Rand Model HPE-450-2S rotary screw compressor, rated at 2099 acfm, at 150 psi, driven by a 450 Hp electric motor. By preference, each compressor 40 is conventionally outfitted with an after cooler, moisture separator, particulate filter and desiccant salt tank (for assuring air dryness, which is necessary when using steel abrasive), none of these conventional accessories being illustrated in detail in the drawings.

Although the preferred power for the system described is electrical, except as indicated (e.g. for the transporters 32), in order to minimize power-consumption costs, there are other factors, such as shipyard electrical capacity, portability of equipment, and safety which could influence a decision to power one or more of the subsystems needing power, by other means, e.g. diesel engines for rotary power and diesel-electric engine-generator sets for contractor-generated electrical power.

A representative of the preferred embodiment of the semi-automatic blasting machine 42 of the invention is illustrated in FIGS. 12–17 and 37. Each blasting machine 42 is designed to mount onto a T-bar track 68 on the rail 64 of a platform (54, 56, 62) of a module 34. Each blasting machine 42 is pneumatically operated (i.e. is fed with the abrasive grit, e.g. steel shot, that is sprayed from its nozzle) in a stream of compressed air, from a respective continuous fill blasting vessel 76 on level 1 of a respective shot-blast unit 36.

Because the blasting machine is mounted to the platform rather than being hand held by a human operator (i.e. by a blaster), the blaster can use higher blast pressures, throughout all of their work shift, and larger nozzle sizes, for improving productivity. Also, this type of mounting eliminates the load on the human operator from the blast hose weight, as well as the reaction force experienced when holding a nozzle aimed at the hold wall while traversing it along a work path.

In the preferred embodiment of use of the apparatus depicted, five blasting machines 42 are installed on the T-bar tracks 68 of each module 34 that is in use for blasting. As each module 34 is positioned to place the one (or preferably two sides of the platform near hold wall surfaces) in need of being blast-cleaned, the blasting machines 42 are traversed along the T-bar track or tracks by the human operators (although some mechanization, robotic or remote operation certainly is within the contemplation of the invention). Because all of the blasting machines 42 are operating within generally the same heightwise, horizontally extensive band, not only must the horizontal trolley 56 be moved from time to time, but the vertical trolley 54 must be progressively raised or lowered (depending on which way the work is progressing).

To use a blasting machine 42, the human operator simply installs a blast hose 126 connected to the nozzle 124 through an oscillatably mounted tube 128, secures a reaction nut 130 to lock the blast hose 126 to the tube 128, and connects a compressed air line (not shown) from a respective vessel 76 on the unit 36. A deadman switch (not shown) preferably is provided for convenient use by the operator for stopping the blast stream at any time in the conventional manner. (See FIG. 37.) Each human operator (blaster) should be fully outfitted with normal protective gear conventionally worn by blasters, when using a blasting machine 42. The tube 128, as shown, is mounted to the T-bar track 68 by a mechanical assembly 132 which allows the nozzle to be oscillated in a (preferably) 60 degree arc about a horizontal axis (e.g. 30 degrees up and 30 degrees down, from horizontal) which will permit the blaster to clean a 66 mm high swath with the tip of the nozzle 124 positioned 150 mm away from the work surface. The mechanical assembly also is slidable along the T-bar track 68, so that, in addition to tilting the blasting machine 42 up and down, the blaster can push or pull it along the track 68, at a rate that is determined by the blaster by observing the progress of the work. By preference, and as shown, the mechanical assembly 132 includes left and right arms 134 having adjustably divergent outer ends separately slidably mounted to the track 68. By adjusting the degree of divergence at 136, the blaster can effectively extend and retract the nozzle tip relative to the platform. This, in effect, allows the human operator easily to adjust the nozzle position in relation to the work surface. This is particularly needed or helpful when working on corrugated bulkheads, and shell stiffeners insofar as these features intrude into the spare of the hold. The divergence adjustment feature 136 preferably comprises a screw mechanism accessible to the operator for making the adjustment. For blasting upwardly and downwardly sloping surfaces, the mechanical assembly not only can be rotated up or down, within the 60 degree arc previously described, but also preferably can be locked, by a position-locking arrangement 138.

By preference, the blast hose 126 may be fitted with angled replacements for the straight-ahead tip of the nozzle 124 depicted, so as to permit the blaster to clean behind stiffeners and similar structural features encountered in holds. To the extent needed, it is, of course, possible for a blaster to demount a nozzle 124 from an oscillatable tube 128, in order to manually support aim the nozzle, while blasting, in order to reach otherwise inaccessible places. When all of the operators have finished blast-cleaning all of the surface that they can reach from the platform in its current position, one of them shifts the platform vertically and/or horizontally to bring the blasters into new territory in need of blast-cleaning. When all that can be reached from the module 34 located in its current location relative to the bottom wall (tank top 30), the transporter 32 is used to shift the module 34 to a new location, whereupon blasting work continues, until all blast cleaning that can be accomplished from the module 34 has been completed. At this point, if coating is to be done in some other way than from the module 34, the various ducts, hoses and lines are disassembled to the extend necessary and the hatch plug assembly 106 is removed, and the equipment 34, 36 32 is lifted out of the hold and moved to where it is needed next.

However, if coating is to be performed from the module 34, only so much of the above-described equipment as is uniquely needed for the blasting operation is disassembled and lifted out, and repositioned for its next use, and coating is accomplished from the module 34, with the hatch plug assembly 106 (or one like it but tailored to the coating process requirements) in place as depicted for the blasting operation.

Details of coating are not addressed in this particular document. Coating may be accomplished by spray painting from the work platform, e.g. using hand-held paint spraying nozzles connected to paint supplies that are delivered by pressurization. Or, the coating machine nozzles may be mounted to the oscillating tubes 128, and moved and adjusted much as has been described above in relation to blasting. Or, other, e.g. more robotic spraying arrangements (not shown) can be provided.

It should now be apparent that the self-contained staging system for cleaning and painting bulk carrier cargo holds as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for applying work to internal wall surfaces of a bulk cargo vessel hold, by one or more operators working from a platform, comprising the steps of:
   (a) lowering into the hold so as to become supported on the deck of the hold, an apparatus, comprising:
      framework providing a vertical tower having a base;
      a shiftable support structure arranged for supporting the tower base and arranged for shifting the tower about in each of two mutually orthogonal horizontal direction on a substantially horizontal deck of the hold, for stationing the tower in proximity with each of four corners where respective pairs of sidewalls of the hold meet one another;
      a vertical trolley mounted to the vertical tower and vertically movable thereon to assume and maintain each of a plurality of selected vertical elevations;
      a horizontal trolley mounted to the vertical trolley and bidirectionally horizontally movable thereon to assume and maintain each of a plurality of selected horizontal positions relative to the vertical tower, including a first extreme of extension in one direction to one side of the vertical tower and a second extreme of extension to an opposite side of the vertical tower;
         an operator walkway provided on said horizontal trolley; and
         a complement of supply systems for use in performing work on said surface, at least some of said systems being supported on said deck of said hold;
   (b) from the walkway, with said tower located in a first location on said deck of said hold, applying work to internal surfaces of two sidewalls of said hold which meet at a first corner, using supplies supplied from said systems;
   (c) shifting said tower to a second location on said deck of said hold, by operating said shiftable support structure while said shiftable support structure is disposed in supporting relation to said tower;
   (d) from the walkway, with said tower located in said second location on said deck of said hold, applying work to internal surfaces of two sidewalls of said hold which meet at a second corner, using supplies supplied from said systems; and
   (e) lifting said tower, said supply systems supported on said deck of said hold, and said shiftable support structure out of said hold.

2. The method of claim 1, further comprising:
   (f) repeating steps (c) and (d) twice more, respectively for shifting said tower to a third and a fourth location and applying work to internal surfaces of two sidewalls of the hold which respectively meet at a third and a fourth corner, before conducting step (e).

3. The method of claim 2, wherein:
said work comprises at least one of cleaning and coating said surfaces.

4. The method of claim 3, comprising:
conducting steps (a)–(d) and (f) twice in succession, once for cleaning and a second time for coating, before conducting step (e).

5. The method of claim 4, wherein:
said cleaning comprises blasting with abrasive grit and said coating comprises spraying with a coating composition.

6. The method of claim 1, wherein said supply systems supported on said deck of said hold are provided on a second tower, further comprising:
in conjunction with conducting step (c), also operating said shiftable support structure while said shiftable support structure is disposed in supporting relation to said second tower, for shifting location said supply systems supported on said deck of said hold.

7. The method of claim 6, wherein:
said step of applying work includes spraying abrasive grit from at least one nozzle at said internal surfaces of said two sidewalls.

8. The method of claim 7, wherein:
said supply systems supported on said deck of said hold include at least one hopper for supplying abrasive grit to each said nozzle from on board said second tower; and further including:
   receiving spent abrasive mixture at a recycling station located on board said second tower;
   at said recycling station separating from said spent abrasive mixture a reusable fraction of abrasive grit; and
   supplying said reusable fraction of abrasive grit from said recycling station to said at least one hopper.

9. The method of claim 8, wherein:
said abrasive grit comprises steel shot.

10. The method of claim 1, wherein:
said step of applying work includes spraying abrasive grit from at least one nozzle at said internal surfaces of said two sidewalls.

11. The method of claim 10, further comprising:
horizontally shiftably supporting each said nozzle on at least one track extending along said operator walkway, and shifting each nozzle along the respective said track while spraying said abrasive grit therefrom.

12. The method of claim 11, further comprising:
changing angulation of at least one said nozzle about a horizontal axis to at least one tilted angulation while conducting step (d), for reaching locations on said internal surfaces located at least one of above and below where the respective nozzle is supported by the respective said track.

13. The method of claim 12, further comprising:
fixing said at least one nozzle in at least one said tilted angulation while horizontally shifting the respective at least one nozzle along the respective said track.

14. The method of claim 11, further comprising:
adjusting proximity of at least one said nozzle from the respective said track, in conjunction with conducting step (d), for adjusting proximity of the respective at least one nozzle to a respective said sidewall.

* * * * *